H. J. GILBERT.
BUSHING.
APPLICATION FILED MAY 23, 1904.
995,531.
Patented June 20, 1911.
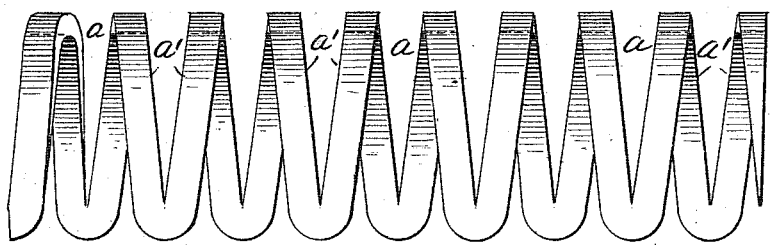
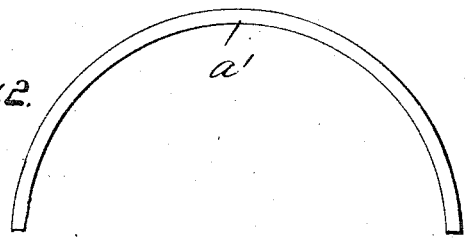

UNITED STATES PATENT OFFICE.

HENRY J. GILBERT, OF SAGINAW, MICHIGAN.

BUSHING.

995,531.  Specification of Letters Patent.  Patented June 20, 1911.

Application filed May 23, 1904. Serial No. 209,339.

*To all whom it may concern:*

Be it known that I, HENRY J. GILBERT, a citizen of the United States, residing at Saginaw, in the county of Saginaw and State of Michigan, have invented certain new and useful Improvements in Bushings, of which the following is a specification.

My invention relates to bushings intended and more particularly adapted to pulleys, and the object thereof is to produce a simple and efficient bushing of this character from sheet metal.

As herein shown, my improved bushings comprise in effect a series of reversely arranged strips connected together and by preference made of sheet metal properly cut and expanded and folded or formed to the required shape and diameter.

In the drawings, Figure 1 is a perspective illustrating a strip of sheet metal cut and expanded to form a bushing; Fig. 2 an end view of a semi-cylindrical bushing member made from the strip shown in Fig. 1, and Fig. 3 an end view of a complete bushing composed of two such members.

Upon reference to the drawings, it will be observed that I have illustrated the sectional type of bushing, the entire bushing consisting of a pair of similar halves semi-circular in cross-section and adapted to be employed in the so-called sectional or split type of pulley. However, before proceeding with a description of my invention, I desire it understood that my invention is not restricted in any manner to the sectional type of bushing, but that it may be applied with equal advantage to the so-called single piece bushing.

Referring to the preferred method of manufacture of my improved bushing, I take a strip of sheet metal of the proper thickness and of a width dependent upon the diameter of the bushing desired, and cut or slit it with parallel slits $a$ alternately entering the opposite sides of the strip and extending almost entirely across the same but leaving enough thereof to form a connection between the ends of the adjacent bars $a'$. By expanding the strip in suitable manner, the cuts or slits are opened up as illustrated in Fig. 1, and after being thereupon folded to semi-circular form, with its slits lying transversely to the axis of the bushing, a semi-cylindrical bushing member as shown in Figs. 1 and 2 results, a complete bushing comprising two such members arranged as shown in Fig. 3.

Bushings embodying my principle of construction enjoy the advantages of simplicity and economy of manufacture while possessing all the required elements of strength and serviceability.

I claim:

1. A semi-cylindrical sheet metal bushing member having two series of alternately arranged cuts, the sides of each cut spreading spirally in opposite directions from an apex near one longitudinal edge of the bushing member to points in the opposite edge of the member.

2. A two-part bushing comprising a pair of similar semi-cylindrical sheet metal members, each member being formed with two series of alternately arranged cuts and the sides of each cut spreading spirally in opposite directions from an apex near one longitudinal edge of the member to points in its opposite edge.

HENRY J. GILBERT.

Witnesses:
S. E. HIBBEN,
LOUIS B. ERWIN.

---

Copies of this patent may be obtained for five cents each, by addressing the "Commissioner of Patents, Washington, D. C."